US011014841B2

(12) United States Patent
Bruggink et al.

(10) Patent No.: US 11,014,841 B2
(45) Date of Patent: May 25, 2021

(54) APPLICATION AND RECOVERY OF SCALE INHIBITORS IN DOMESTIC APPLIANCES

(71) Applicant: KONINKLIJKE PHILIPS N.V., Eindhoven (NL)

(72) Inventors: Wilhelmus Hendrikus Maria Bruggink, Eindhoven (NL); Shary Bonbon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 444 days.

(21) Appl. No.: 15/570,769

(22) PCT Filed: Apr. 29, 2016

(86) PCT No.: PCT/EP2016/059574
§ 371 (c)(1),
(2) Date: Oct. 31, 2017

(87) PCT Pub. No.: WO2016/180647
PCT Pub. Date: Nov. 17, 2016

(65) Prior Publication Data
US 2018/0118596 A1    May 3, 2018

(30) Foreign Application Priority Data

May 8, 2015    (EP) .................................... 15167036

(51) Int. Cl.
*C02F 5/14*    (2006.01)
*C02F 1/00*    (2006.01)
(Continued)

(52) U.S. Cl.
CPC .............. *C02F 5/14* (2013.01); *A47J 31/465* (2013.01); *A47J 31/54* (2013.01); *C02F 1/003* (2013.01);
(Continued)

(58) Field of Classification Search
CPC .. C02F 5/14; C02F 1/003; C02F 1/281; C02F 1/686; C02F 1/688; C02F 1/28;
(Continued)

(56) References Cited

U.S. PATENT DOCUMENTS 5,156,739 A * 10/1992 Dawson ............. B01D 19/0031
                                                    210/321.8
5,501,798 A *  3/1996 Al-Samadi ............. B01D 61/04
                                                    210/652
(Continued)

FOREIGN PATENT DOCUMENTS

CN        102453178 A    5/2012
WO        0610997 A1    8/1994
(Continued)

OTHER PUBLICATIONS

Witkamp et al. Adsorption of Phosphonate Antiscalant from Reverse Osmosis Membrane Concentrate onto Granular Ferric Hydroxide. Environ. Sci. Technol. 2012, 46, 9638-9645. (Year: 2012).*

(Continued)

*Primary Examiner* — Katherine Zalasky McDonald
(74) *Attorney, Agent, or Firm* — Schott, P.C.

(57) ABSTRACT

The invention provides a domestic appliance (100) configured to provide descaled water (2) during operation, wherein the domestic appliance (100) comprises (i) a descaling unit (200) for the production of descaled water (2), wherein the descaling unit (200) comprises a descaling reactor (210), a descaling unit inlet (201) for introduction of water (1) into the descaling reactor (210) and a descaling unit outlet (202) for release of descaled water (2) from the descaling reactor (210), and (ii) a scale inhibitor dosing unit (300) configured to provide a scale inhibitor (310) to the descaling reactor (210), wherein the scale inhibitor (310) comprises a phosphonate; wherein the descaling unit (200) further comprises an outlet unit (220) comprising (i) said descaling unit outlet (Continued)

(202) and (ii) a scale inhibitor adsorbent (230) configured upstream of said descaling unit outlet (202), wherein the scale inhibitor adsorbent (230) is selective for said scale inhibitor (210).

13 Claims, 4 Drawing Sheets (51) Int. Cl.
    *A47J 31/46*     (2006.01)
    *A47J 31/54*     (2006.01)
    *C02F 1/28*     (2006.01)
    *C02F 1/68*     (2006.01)

(52) U.S. Cl.
    CPC .............. *C02F 1/281* (2013.01); *C02F 1/686* (2013.01); *C02F 1/688* (2013.01); *C02F 2303/18* (2013.01); *C02F 2303/22* (2013.01); *C02F 2307/10* (2013.01)

(58) Field of Classification Search
    CPC .... C02F 1/54; C02F 1/542; C02F 1/52; C02F 1/68; C02F 2303/18; C02F 2303/22; C02F 2307/10; C02F 2307/12; A47J 31/465; A47J 31/54; B01D 15/00
    See application file for complete search history.

(56) References Cited

U.S. PATENT DOCUMENTS

| | | | | |
|---|---|---|---|---|
| 5,507,108 | A * | 4/1996 | Bruggink | D06F 75/14 38/77.8 |
| 6,365,101 | B1 * | 4/2002 | Nguyen | C02F 5/00 422/13 |
| 7,144,513 | B2 * | 12/2006 | Sher | C02F 5/04 210/697 |
| 8,623,273 | B2 * | 1/2014 | Lu | F28F 19/00 134/6 |
| 2003/0132167 | A1 * | 7/2003 | Haase | C02F 1/008 210/696 |
| 2006/0070952 | A1 * | 4/2006 | Jin | B01J 20/06 210/638 |
| 2008/0011683 | A1 * | 1/2008 | Dong | B01J 20/3244 210/662 |
| 2009/0283464 | A1 * | 11/2009 | Oe | E03B 1/02 210/198.1 |
| 2010/0072140 | A1 * | 3/2010 | Tsuji | B01J 20/041 210/681 |
| 2010/0243570 | A1 * | 9/2010 | Mayer | C02F 1/36 210/665 |
| 2012/0074071 | A1 * | 3/2012 | Hassler | C02F 1/5236 210/763 |

FOREIGN PATENT DOCUMENTS

| | | |
|---|---|---|
| WO | 0064821 A1 | 11/2000 |
| WO | 20050108311 A1 | 11/2005 |
| WO | 2006101360 A1 | 9/2006 |
| WO | 20090045100 A1 | 4/2009 |
| WO | 20130053627 A1 | 4/2013 |

OTHER PUBLICATIONS

J. Marra, T.L.G Thijssen, "Chemical Scaling Inhibitors and Their Possible Application in Steam Irons and Coffee-Makers", NL-TN 1992-122.
Boels, L. Keesman, K.J., Witkamp, G.J. "Adsorption of Phosphonate Antiscalant From Reverse Osmosis Membrane Concentrate Onto Granular Ferric Hydroxide", Environ Sci Technol, Sep. 4, 2012.
Bernd Nowack, Aminopolyphosphonate Removal During Wastewater Treatment, Water Research 36 (2002) 4636-4642.

* cited by examiner

APPLICATION AND RECOVERY OF SCALE INHIBITORS IN DOMESTIC APPLIANCES

This application is the U.S. National Phase application under 35 U.S.C. § 371 of International Application No. PCT/EP2016/059574, filed on Apr. 29, 2016, which claims the benefit of International Application No. 15167036.1 filed on May 8, 2015. These applications are hereby incorporated by reference herein.

FIELD OF THE INVENTION

The invention relates to a domestic appliance as well as to a method for descaling water, such as for use in such domestic appliance.

BACKGROUND OF THE INVENTION

The issue of scale in domestic type appliances using water is known in the art. WO2006101360, for instance, describes a laundry machine comprising a body for defining an exterior, a water supply valve provided in the body and connected with an outer water supply device, a drum rotatably mounted within the body, at least one steam generator for supplying steam into the drum, and a water treatment apparatus for treating water supplied to the steam generator, wherein the water treatment apparatus prevents scale from being generated in the steam generator.

WO2009/045100 describes a method and a device for purifying a liquid, comprising the steps of: supplying a liquid for purifying provided with a quantity of crystal growth inhibitor, separating the liquid, with the added crystal growth inhibitor, into a purified liquid flow and a residual flow, discharging the separated purified liquid flow, discharging other parts of the liquid flow as a residual flow, adding a crystallizing agent to the residual flow for the purpose of forming crystals in the residual flow, removing the formed crystals from the residual flow, discharging the purified residual flow, and discharging the formed crystals.

WO2005/108311 describes a method that reduces limestone scale deposit on surfaces and in heating elements, especially, for drinking water in foodservice vending and dispensing machines without affecting the water quality. The method includes passing the water through metal particulate and polyphosphates to remove minerals therefrom and thus reduce scale deposits upon water contacted portions of such machines.

SUMMARY OF THE INVENTION

Scale formation, also known as calcification, is an issue in many household appliances that use water, in particular hard tap water. Repeated use of these household appliances causes a build up of scale which can dramatically reduce the efficiency or quality of the function provided by the appliance. To avoid this reduced functionality and to prevent malfunction, regular cleaning is required to remove the scale, also known as descaling, decalcifying or decalcification. Consequences of failing to descale devices may include, for example, formation of scale in coffee makers blocking the fluid flow or insulating the heating element. In steam irons scaling may lead to brownish colored water being spat onto garments, which is not desired. Furthermore, hard tap water used in air humidifiers based on ultrasonic transducers may spread white scaling dust, which is also not desired.

It is known to provide a decalcifying apparatus with disposable cartridges, for example by means of ion exchange resins. Ion exchange resins decalcify water by substituting calcium and magnesium ions with magnesium or potassium ions. However, the resins replace calcium and magnesium ions in water with magnesium ions, which makes the treated water very magnesium rich. Magnesium rich water is generally not suitable for making tea, soy milk or diluting powder baby milk.

Thus, many domestic appliances process (drinking) water. This process involves many times a heating step where the water is heated up to elevated temperatures or even taken to boiling. During this thermal treatment Ca and Mg ions will start to precipitate from the water by forming sparingly soluble salts like carbonates, sulphates, hydroxides etc. This irreversibly precipitation can settle on the interior of piping, valves, venturies, and other components or parts as present in the water flow path. This leads to decreased functional performance of the domestic appliance and finally even to malfunctioning of the device. The consumer will experience this by longer processing times and visual contamination of aesthetic elements of the device. To restore the performance and/or high quality aesthetic design of the device the consumer has to perform extra actions. These actions comprise rinsing with (acid) solutions and are inconvenient to do.

Hence, it is an aspect of the invention to provide an alternative domestic appliance, which preferably further at least partly obviates one or more of above-described drawbacks. Yet, it is further an aspect of the invention to provide an alternative method for descaling water in a domestic appliance, which preferably further at least partly obviates one or more of above-described drawbacks.

Scale inhibitors like poly-phosphates and phosphonates are well known for their properties of limiting scale nucleation and growth. They are widely applied in the food processing and drinking water industry. Many different types of scale inhibitor exist. Most common types contain either inorganic phosphate or organic phosphate. Organic phosphates, a synthetic inhibitor, often denoted as phosphonates, show a superior anti scaling performance over a broad temperature and water quality range. A typical example is hydroxy-ethylidene 1,1-di-phosphonic acid or its corresponding salt. This phosphonate inhibitor is stable and effective at temperatures (even) above 100° C.

However, it may be less desirable that phosphonic compounds enter the potable water. Hence, it is also an aspect of the invention to provide an alternative domestic appliance, which preferably further at least partly obviates the problem of phosphonate in the water used e.g. for drinking or drinks Yet, it is further also an aspect of the invention to provide an alternative method for descaling water in a domestic appliance, which preferably further at least partly obviates the problem of phosphonate in the water used e.g. for drinking or drinks.

Further, to avoid that these scale inhibitors end up e.g. in a final beverage product after their performance they are preferably effectively and efficiently filtered out. This ensures that the end product provided by the domestic appliance stays pure and natural. In this way the consumer is offered a pure and natural beverage.

By choosing adsorbents that show a high selectivity and that have a high capacity loading a small filter can be integrated in the domestic appliance.

Hence, the invention provides amongst others a (controlled) inhibitor dosing system and an adsorbent filter put in conjunction such that an effective anti-scale solution is provided for domestic appliances without making any modification in composition to the end product delivered by the domestic appliance.

The effectiveness of the descaling and removal of scale inhibitor is very large. Only very small amounts of the scale inhibitor are necessary, and these small amounts can also relatively easily be adsorbed by adsorbents for such scale inhibitors. For instance, for an effective inhibitor concentration of 1 ppm and a life time capacity of 1500 liters of water (beverage) an amount of 15 grams of adsorbent needs to be present in a filter embodiment. The adsorbent can be applied in e.g. a packed filter bed. Other embodiments like a fluidized bed, coated substrates might work as well. Considering an average packed density of 1.35 g/cm$^3$ for a packed GFH filter (see also below) bed a total filter volume of only about 25 ml would be required. A volume flow of about a few ml/s will lead to a residence time of several seconds. This residence time is sufficient to cover for the kinetic aspects involved in inhibitor transport to the active storage sites of the adsorbent.

Hence, in a first aspect the invention provides a domestic appliance ("appliance") configured to provide descaled water during operation, wherein the domestic appliance comprises: (a) a descaling unit for the production of descaled water, wherein the descaling unit comprises a descaling reactor ("reactor"), a descaling unit inlet for introduction of water into the descaling reactor and a descaling unit outlet for release of descaled water from the descaling reactor; and (b) a scale inhibitor dosing unit ("dosing unit") configured to provide a scale inhibitor (sometimes also indicated as "descaling agent" or "descalant" or "inhibitor") to the descaling reactor, wherein the scale inhibitor comprises a phosphonate; wherein the descaling unit further comprises an outlet unit comprising (i) said descaling unit outlet and (ii) a scale inhibitor adsorbent ("adsorbent") configured upstream of said descaling unit outlet, wherein the scale inhibitor adsorbent is selective for said scale inhibitor.

With such domestic appliance, effectively calcium can be filtered out whereas the means to filter the calcium out may substantially not end in the potable water. It appears that in the range of only a few ppm of scale inhibitors already a large descaling can be achieved. Prior art solutions such as with ion exchange resins or chelating agents require much larger amounts. This will also have impact on the dimensions of the domestic appliance. For instance, with the present invention a coffee-maker can be made and provided with a tablet of in the range 5-30 gram, such as 5-10 gram, scale inhibitor which can be active for the whole lifetime of the appliance. Further, it appears effective to have the scale inhibitor adsorbent as close as possible to the descaling unit outlet. In this way, it appears that downstream scaling can further substantially be prevented.

Herein, the domestic appliance is especially selected from the group consisting of a floor steam cleaner, a food steamer, a kettle, a coffee maker, an espresso maker, a tea maker, a hot chocolate maker, a soup maker, a water cooker, a water carbonator, a water softener, a water purifier, a steam generation device, a steam iron, and an air humidifier. In yet another embodiment, the domestic appliance may comprise a beverage dispenser.

These devices can be configured to be in fluid contact with a (permanent) water supply network or water mains, or these devices may be stand alone devices, such as e.g. a stand-alone steam generating device, a water cooker, etc. Especially, the domestic appliance is an appliance wherein a heating step of water is applied, as especially then scaling may be a problem. Further, especially the domestic appliance is an appliance wherein the water is used for potable purposes. Hence, in such instances it may be less desired that the scale inhibitor is available in the descaled water. Further, especially the domestic appliance is an electronic domestic appliance, including e.g. an electronic heating element and optionally other functionalities. Especially, an (electronic) domestic appliance may especially be defined as a piece of electrical equipment used in the home, especially in the kitchen. Domestic appliances may, however, also be used in offices. In general, domestic appliances are not industrial appliances, but include relative small units, including e.g. portable units. Hence, the term "domestic appliance" also relates to a coffee machine as embodiment of coffee maker, a soup machine as embodiment of a soup maker, etc. Further, the domestic appliance may be a wireless domestic appliance, such as comprising a (rechargeable) battery and/or may be a wired domestic appliance.

Herein, the terms "descaled" or "descaled water" refer to water downstream from the descaling unit or water having been subjected to a descaling stage. The term "descaling" or "descaling stage" imply that conditions are imposed to the water that allow a reduction in the calcium (ion) and/or magnesium (ion) deposit from the water. These terms do not imply a complete removal of these species. Further, the use of the domestic appliance does not exclude the use of deionized water. In such instance, also conditions are imposed to the water that allow a reduction in the calcium (ion) and/or magnesium (ion) deposit from the water, but there will not be an effective descaling. Nevertheless, for the sake of understanding the terms "water" and "descaled water" are used, to distinguish the water before the descaling stage in the descaling unit and water after the descaling stage in the descaling unit. Hence, the descaling stage especially implies that conditions are imposed to the water that allow a reduction in the calcium (ion) and/or magnesium (ion) deposit from the water. As further indicated below, this may especially imply that said scale inhibitor is added to the water in the range of 0.1-10 ppm, i.e. the amount of scale inhibitor in the water is in the range of 0.1-10 ppm. Further, when the scale inhibitor is homogeneously distributed through the water the time to descale the water may only be a few seconds. Hence, the stages of (a) combining water and scale inhibitor and (b) descaling said water may in total only take about 1-60 seconds, even only 1-20 seconds, such as 2-20 seconds. Optionally, the descaling reactor may further include one or more mixing elements, to further facilitate mixing of the scale inhibitor and the water.

As indicated above, the domestic appliance comprises a descaling unit for the production of descaled water, wherein the descaling unit comprises a descaling reactor, a descaling unit inlet for introduction of water into the descaling reactor and a descaling unit outlet for release of descaled water from the descaling reactor. Hence, the descaling unit is configured to provide during operation of the domestic appliance descaled water. The descaling unit comprises a descaling reactor, and optionally one or more other elements such as a pump, tubing, a valve, a heating element, etc. etc.

The descaling reactor is a volume wherein the descaling stage may take place. In general, there are two options that can be used to introduce the scale inhibitor: a separate unit may substantially independent of the introduction of water into the descaling reactor introduce the scale inhibitor, or the introduction of water and introduction of scale inhibitor are combined, such as in a flow through scale inhibitor dosing unit. Hence, the descaling reactor is especially a reactor wherein at least part of the descaling stage takes place.

Further, especially in this reactor also heating of the (descaled) water may take place. See further also below.

The descaling unit comprises a descaling unit inlet for introduction of water into the descaling reactor and a descaling unit outlet for release of descaled water. In between, the descaling reactor is configured. Hence, the descaling unit inlet is in fluid contact with the descaling reactor, though one or more elements like a tube, a valve, a pump, etc. may be downstream from said descaling unit inlet (and upstream of the descaling reactor). Optionally, the descaling unit inlet is comprised by the descaling reactor. Likewise, the descaling unit outlet is in fluid contact with the descaling reactor, though one or more elements like a tube, a valve, a pump, etc. may be upstream from said descaling unit outlet (and downstream from the descaling reactor). Optionally, the descaling unit outlet is comprised by the descaling reactor. The release of descaled water may in embodiments occur under elevated pressures. In general, as indicated above, the descaled water released from the descaling reactor will be heated, such as for making a beverage of for steaming, etc. Terms like "descaling unit inlet" or "descaling unit outlet", etc., may also refer to a plurality of descaling unit inlets or a plurality of descaling unit outlets, respectively.

The descaling reactor may in principle have any shape. In an embodiment, the descaling reactor has a tubular like shape, with an inlet at one side and an outlet at an opposite side (at an other end of the tube), with the inlet in fluid contact with the descaling unit inlet, and with the outlet in fluid contact with the descaling unit outlet (or being the descaling unit outlet). Over part of the length of the tubular like shaped reactor, heating elements may be applied. In yet a further embodiment, the descaling reactor may be configured as boiler. The term "reactor" may also refer to a plurality of reactors.

As indicated above, the descaling unit further comprises an outlet unit comprising (i) said descaling unit outlet and (ii) a scale inhibitor adsorbent configured upstream of said descaling unit outlet, wherein the scale inhibitor adsorbent is selective for said scale inhibitor. Hence, shortly for the physical release of the descaled water from the descaling unit, the descaled water is subjected to a scale inhibitor removal stage. To this end, the adsorbent is configured substantially as close as possible to the descaling unit outlet. The adsorbent may be configured downstream from the reactor (or reactor volume). However, the adsorbent may also be configured within the reactor, occupying only a part of the total volume of the reactor which is substantially directly upstream of a reactor outlet which is in fluid contact with the descaling unit outlet (of which reactor outlet is the descaling unit outlet). Therefore, the descaling unit of the domestic appliance comprises an outlet unit comprising (i) said descaling unit outlet and (ii) a scale inhibitor adsorbent configured upstream of said descaling unit outlet. Thus, especially the descaling unit outlet is comprised by the outlet unit. The outlet unit is a part of the descaling apparatus comprising said adsorbent and said descaling unit outlet. This outlet unit may be separate of the descaling reactor or partly be integrated with the descaling reactor.

The scale inhibitor adsorbent is especially selective for said scale inhibitor. This may especially imply that the adsorbent is able to bind phosphonates. These phosphonates are coordinating/binding calcium and or magnesium. In this way, the water is descaled and the calcium and/or magnesium and their scale inhibitor are bound to the adsorbent, thereby allowing the descaling unit to release descaled water without substantial presence of scale inhibitor.

The scale inhibitor adsorbent may be configured in several ways. For instance, the adsorbent may include particles (granules) and/or the adsorbent may include a membrane. However, the adsorbent may also be immobilized at a wall of at tube through which the descaled water flows, etc. In a specific embodiment, the descaling unit comprises a membrane comprising said scale inhibitor adsorbent, wherein the membrane is configured such that water from the descaling reactor can only reach the descaling unit outlet via (i.e. especially through) the membrane. Therefore, in an embodiment the membrane may be positioned in the descaling unit outlet. Hence, upstream of the membrane descaled water with phosphonate is available and downstream descaled water with a reduced phosphonate content is available (reduced relative to the content or concentration upstream of the membrane). In this configuration, the membrane is configured as flow-through membrane, with the membrane being permeable for water, and substantially impermeable to the scale inhibitor. However, in other embodiments the adsorbent may also be configured as membrane in a cross-flow configuration. The membrane may be configured as a flat membrane or as a curved membrane or as a spiral wound membrane, etc. The membrane may be configured in the reactor or in a separate volume downstream of the reactor but upstream of the descaling unit outlet, see also below.

In a specific embodiment, the outlet unit comprises an adsorbent unit, comprising an inlet in fluid connection with the descaling reactor, and an outlet, in fluid communication with the descaling unit outlet, wherein the adsorbent unit is configured to contain the scale inhibitor adsorbent while allowing transport of water through the adsorbent unit. Hence, in this embodiment a separate volume downstream of the reactor but upstream of the descaling unit outlet is provided, for instance for hosting the membrane scale inhibitor adsorbent (see also above) or for other types of scale inhibitor adsorbents. The term "adsorbent unit" may also refer to a plurality of adsorbent units. Alternatively or additionally, the descaled water may be contacted more than once with the scale inhibitor adsorbent, e.g. via recirculation. In embodiments, the outlet of the adsorbent unit may coincide with the descaling unit outlet.

Instead of or in addition to a membrane, also a particles or granules may be applied as scale inhibitor adsorbent. Such particles will in general be in the range of 0.1 µm-20 mm, such as 1 µm-10 mm, and are therefore also indicated as granules. Hence, in a specific embodiment the adsorbent unit comprising a fluidized bed system, which in operation provides a fluidized bed of scale inhibitor adsorbent in water. In an embodiment, the particles or granules may be porous. Alternatively or additionally, in embodiments the adsorbent unit comprises a membrane, such as described above (or below). Hence, in embodiments the adsorbent unit may be configured to contain the inhibitor adsorbent, such as adsorbent particles or a membrane. As indicated above, the membrane is especially configured such that water from the descaling reactor can only reach the descaling unit outlet via (i.e. especially through) the membrane. Therefore, especially during a descaling process the inhibitor adsorbent is contained in the adsorbent unit and does especially not (substantially) leave the adsorbent unit.

In an embodiment, the adsorbent unit is configured as replaceable unit. In yet another embodiment, the adsorbent unit is integrated in the domestic appliance. Hence, especially at least during use of the domestic appliance, the descaling unit comprises the scale inhibitor adsorbent. In embodiments, the scale inhibitor adsorbent may be provided to the descaling unit during production of the domestic appliance. As indicated above, the scale inhibitor adsorbent is selective for said scale inhibitor. Especially, the scale inhibitor adsorbent is selective for a scale inhibitor intended to be used with the domestic appliance. In embodiments, the domestic appliance comprises the scale inhibitor dosing system including said scale inhibitor and/or the domestic appliance comprises the outlet unit comprising the scale inhibitor adsorbent.

Further, as indicated above it appears effective to have the scale inhibitor adsorbent as close as possible to the descaling unit outlet. Hence, in a further embodiment the descaling unit comprises a first volume (V1) downstream of the scale inhibitor adsorbent and upstream of the descaling unit outlet, wherein the descaling reactor comprises a descaling reactor volume (V2), wherein the first volume and the descaling reactor volume have a ratio $V1/V2 \leq 0.1$, such as in the range of $V1/V2 \leq 0.01$. Note that when the adsorbent is substantially at an end of the descaling unit outlet $V1/V2 \approx 0$. Especially, the first volume is equal to or smaller than 50 ml, such as equal to or smaller than 20 ml, such as equal to or smaller than 10 ml.

The domestic appliance further comprises a scale inhibitor dosing unit configured to provide the scale inhibitor to the descaling reactor. This unit may e.g. be configured to contain a tablet, or other scale inhibitor comprising solid, such as granules, etc., or may be configured to contain a liquid (comprising the scale inhibitor). Hence, especially at least during use of the domestic appliance, the scale inhibitor dosing unit comprises the scale inhibitor. In embodiments, the scale inhibitor may be provided in the dosing unit during production of the domestic appliance.

In an embodiment, the unit may be configured as flow-through unit. As indicated above, in general, there are two options that can be used to introduce the scale inhibitor: a separate unit may substantially independent of the introduction of water into the descaling reactor introduce the scale inhibitor or the introduction of water and introduction of scale inhibitor are combined, such as in a flow through scale inhibitor dosing unit. Especially, the domestic appliance is configured such that the scale inhibitor dosing unit only needs to be filled once during the lifetime of the domestic appliance, or optionally only a few times, like 2-10 times during its lifetime. Lifetimes of domestic appliance may e.g. be in the range of 5-7 years. Hence, the invention also provides a maintenance free domestic appliance (at least with respect to scale formation reduction and/or inhibition), wherein refilling the scale inhibitor dosing unit may not be necessary.

Hence, in an embodiment the scale inhibitor dosing unit is a flow through unit, having a dosing unit inlet for introduction of water and a dosing unit outlet in fluid communication with the descaling reactor. Hence, the water to be descaled entrains the scale inhibitor. In a further specific embodiment the scale inhibitor dosing unit comprising an immobilized slow-release element comprising said scale inhibitor and configure to release scale inhibitor upon contact with water. For instance, a slow-release tablet may be used. However, also polymers may be applied wherein the scale inhibitor is releasably embedded. Embodiment may include substantially any porous or non-porous material (inorganic or organic) that either comprises e.g. void volume to hold the inhibitor or that can be mixed with any other material to provide controlled release of inhibitor. So e.g. porous ceramics, porous plastics, porous metals can do in this respect, but also materials that incorporate inhibitors as an additive. Combinations of two or more dosage types of scale inhibitors, such as a liquid comprising scale inhibitor and granules comprising scale inhibitor, may also be used.

Alternatively or additionally, the scale inhibitor dosing unit comprises a metering unit configured to introduce a controlled amount of descaling liquid into the descaling reactor, wherein the descaling liquid comprises said scale inhibitor. Such embodiment may especially be relevant when a liquid scale inhibitor is applied. However, also part of the water to be descaled may be redirected to the scale inhibitor dosing unit, enriched with concentrated scale inhibitor, and then provided to the descaling reactor to mix with the (remaining) water in the descaling reactor.

Especially, the scale inhibitor dosing unit is configured to maintain a predetermined minimum concentration and/or a predetermined maximum concentration of the scale inhibitor in the descaling reactor, such as especially in the range of 0.1-10 ppm (in the liquid in the descaling reactor).

The apparatus may further comprise a control unit or controller, configured to control one or more of a pump, a valve, a heating element, the scale inhibitor dosing unit, etc. Especially, the control unit may be configured to main a predetermined minimum concentration and/or a predetermined maximum concentration of the scale inhibitor in the descaling reactor, such as especially in the range of 0.1-10 ppm (in the liquid in the descaling reactor). To this end, the control unit may control the scale inhibitor dosing unit, such as output of scale inhibitor from the dosing unit. This may in embodiments amongst others include controlling a metering system and/or controlling influx and out put of water (in the case of a flow-through scale inhibitor dosing unit, etc.

In yet a further embodiment the domestic appliance may further comprise a heating element configured to heat water in the descaling unit. Especially, the heating unit is configured to heat the water in the descaling reactor, especially to a temperature of at least 40° C., such as at least 70° C., such as at least 80° C., even more especially to a boiling temperature. Alternatively, the domestic appliance may comprise a separate heating unit. When there is no separate heating unit, the descaling reactor may also be configured as heating unit. In yet a further embodiment, the heating unit (and thus in some embodiment the descaling reactor) may be configured as steam chamber, and thus be configured to provide steam. As indicated above, the descaling reactor may also be configured as boiler (with especially the descaling reactor heatable by heating one or more heating elements). For instance, Calcium carbonate scaling may become apparent from temperatures of 40° C. onwards.

In a specific embodiment, the scale inhibitor comprises one or more of HEDP (1-hydroxy(ethane-diphosphonic acid)), NTMP (Nitrilotris(methylene-phosphonic acid)), DTPMP (Diethylenetriamine penta(methylene-phosphonic acid)), and a salt of one or more of the afore-mentioned. The term "scale inhibitor" may also refer to a plurality of different scale inhibitors. Especially, at least HEDP is applied. In yet another embodiment, alternatively or additionally the scale inhibitor comprises aminotris(methylene-phosphonic acid) (ATMP). As indicated above, the scale inhibitor may be provided as liquid comprising the scale inhibitor or as a solid material, including a tablet, comprising the scale inhibitor (for a slow release thereof).

In yet a further specific embodiment, the scale inhibitor adsorbent comprises one or more of granular ferric hydroxide (GFH) and waste filtration sand (WFS). The term "scale inhibitor adsorbent" may also refer to a plurality of different scale inhibitors adsorbent. As indicated above, the scale inhibitor adsorbent may be provided as filter, as membrane, as particles, etc. etc.

In yet a further aspect the invention also provides a method for descaling water in a domestic appliance or for a domestic appliance, the method comprising (i) combining water and an amount of a scale inhibitor in a descaling reactor of a descaling unit, and (ii) releasing descaled water from a descaling unit outlet (of said descaling unit), wherein before release from the descaling unit outlet the descaled water is contacted with an inhibitor adsorbent, wherein the scale inhibitor comprises a phosphonate, and wherein the scale inhibitor adsorbent is selective for said scale inhibitor. Especially, the above described combination of descaling unit and scale inhibitor dosing unit is applied. Even more especially, the method is applied with the above described domestic appliance.

In yet a further specific embodiment of the method, the method (further) comprises (i) combining in said mixing stage water and said amount of the scale inhibitor in the descaling reactor of the descaling unit, (ii) heating descaled water in a heating stage, and (iii) releasing the heated and descaled water from the descaling unit outlet, further comprising selecting the amount of scale inhibitor to provide said water with said scale inhibitor in the range of 0.1-10 ppm, wherein further the descaling unit comprises a first volume (V1) downstream of the scale inhibitor adsorbent and upstream of the descaling unit outlet, wherein the first volume (V1) is especially equal to or smaller than 20 ml.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1:
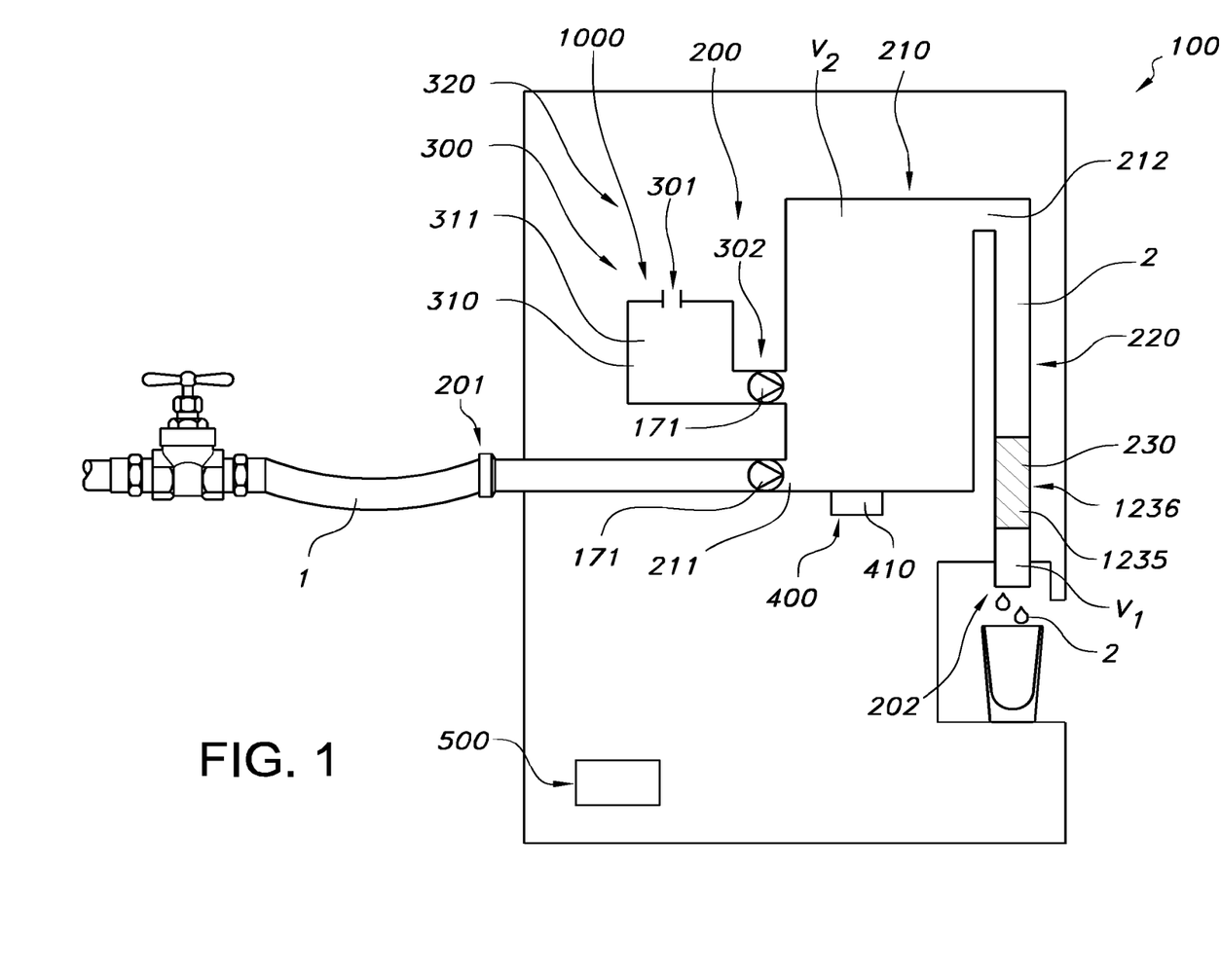
FIG. 1 schematically depicts an embodiment of a domestic appliance, and some specific embodiments of elements of the appliance.

FIG. 1 schematically depicts an embodiment of a domestic appliance 100 configured to provide descaled water 2 during operation from water 1. The domestic appliance 100 comprises amongst others a descaling unit 200 for the production of descaled water 2 and a scale inhibitor dosing unit 300. The domestic appliance 100 is by way of example in fluid connection with a water infrastructure (mains), such as of a house or office. Further, the domestic appliance is by way of example a coffee machine. However, the domestic appliance may also be a stand alone appliance.

The descaling unit 200 for the production of descaled water 2 comprises a descaling reactor 210, a descaling unit inlet 201 for introduction of water 1 into the descaling reactor 210 and a descaling unit outlet 202 for release of descaled water 2 from the descaling reactor 210. Reference 211 indicates the reactor inlet, in fluid communication with the descaling unit inlet 201, and reference 212 indicates the reactor outlet, in fluid communication with the descaling unit outlet 202.

The descaling unit 200 further comprises an outlet unit 220 comprising said descaling unit outlet 202 and a scale inhibitor adsorbent 230 configured upstream of said descaling unit outlet 202. The scale inhibitor adsorbent 230 is especially selective for said scale inhibitor 310. Hence, descaled water 2 escaping from the descaling unit outlet 202 may be decreased in calcium deposits and may also substantially be free from the scale inhibitor adsorbent. Reference 1235 indicates a membrane. The descaling unit 200 in this schematically embodiment by way of example comprises this membrane 1235 comprising said scale inhibitor adsorbent 230. Here, the membrane 1235 is configured such that water 1 from the descaling reactor 200 can only reach the descaling unit outlet 201 via the membrane 1235. Here, the adsorbent 230 is comprised by an adsorbent unit 1236. Note that the membrane 1235 is only one of the possible variants.

The descaling unit 200 comprises a first volume V1 downstream of the scale inhibitor adsorbent 230 and upstream of the descaling unit outlet 202. The descaling reactor 210 comprises a descaling reactor volume V2. Especially, the first volume V1 and the descaling reactor volume V2 have a ratio V1/V2≤0.1.

The scale inhibitor dosing unit 300 is configured to provide a scale inhibitor 310 to the descaling reactor 210. As indicated above, the scale inhibitor 310 especially comprises a phosphonate. Here, the scale inhibitor dosing unit 300 may substantially independently controlled from the influx of water 1. For instance, the scale inhibitor dosing unit 300 may include a liquid comprising the scale inhibitor 310. The liquid is indicated with reference 311. Reference 301 indicates an inlet for introduction of e.g. scale inhibitor (liquid) to the scale inhibitor dosing unit 300. In FIG. 1, by way of example the scale inhibitor dosing unit 300 comprises a metering unit 320 configured to introduce a controlled amount of descaling liquid 311 into the descaling reactor 210. The dosing unit outlet is indicated with reference 302. This outlet is in fluid contact with the descaling reactor 210. The scale inhibitor comprising liquid 311 is one of the possible variants.

Reference 1000 indicates a functional unit comprising the descaling unit and the scale inhibitor dosing system, and optionally also including a heating unit.

Reference 171 indicates pumps and/or valves. These are only depicted by way of example. The domestic appliance or functional unit 1000 may include more or less valves and/or pumps, etc. The term "valve" may also refer to "one-way valve" or "three-way valve", etc.

FIG. 1 also shows a heating element 410. Hence, the descaling reactor may also be used as heating unit, although the descaling reactor and heating unit may also be separate entities (see below). Hence, the descaling reactor 210 is in this schematically depicted embodiment also indicated as heating unit 400.

FIG. 1 also depicts a controller 500, which may be configured to control the apparatus, such as one or more of flows, valves, pumps, etc., but also one or more of the scale inhibitor dosing unit, a heating element, etc. etc.

Figure 2A:
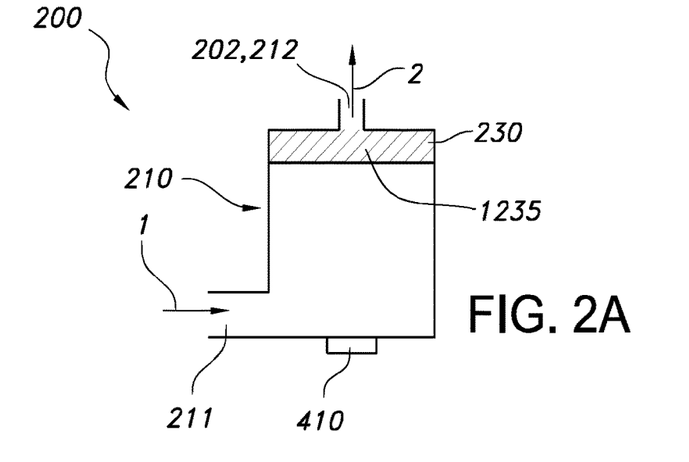
FIGS. 2*a*-2*c* schematically depict some aspects of the descaling unit.
Figure 2B:
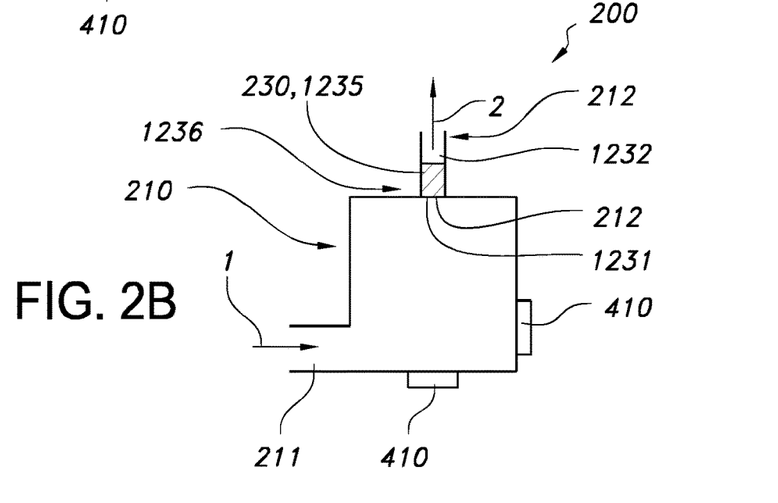
Figure 2C:
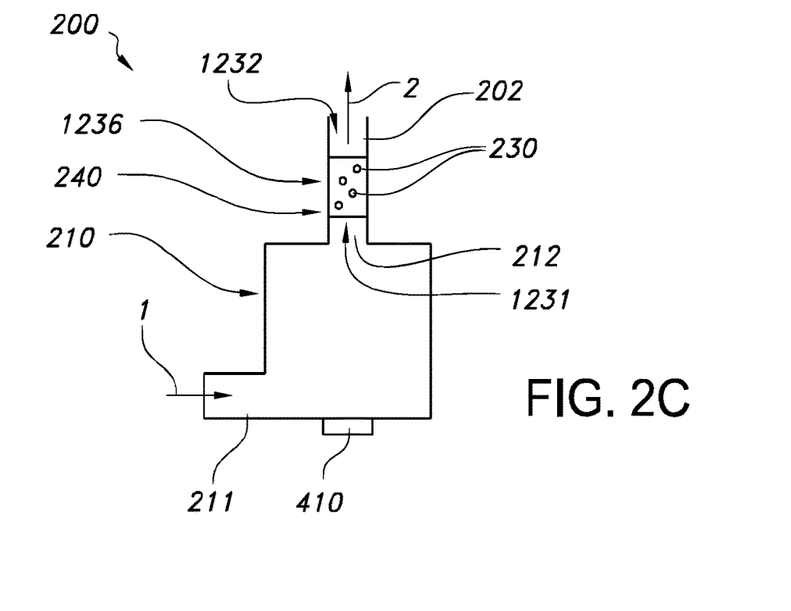

FIGS. 2*a*-2*c* schematically depict some aspects of the descaling unit; other elements, such as e.g. the scale inhibitor dosing unit 300, are not depicted. Here, only by way of example the descaling reactor outlet 212 (or descaling unit outlet 202) are schematically depicted at the top. In FIG. 2*a* the scale inhibitor adsorbent 230 is shown as element configured just before the descaling reactor outlet. The scale inhibitor adsorbent 230 only occupies a minor part of the volume of the descaling reactor, such as less than 1%. For instance, the scale inhibitor adsorbent 230 may be a membrane.

FIG. 2b schematically depicts an embodiment wherein the outlet unit 220 comprises adsorbent unit 1236. This adsorbent unit 1236 comprises an inlet 1231 in fluid connection with the descaling reactor 210, and an outlet 1232, in fluid communication with the descaling unit outlet 202. The inlet and outlet may e.g. comprise a filter, to contain the adsorbent 230 within the unit, but to allow transport of descaled water 2 through the descaling unit. The adsorbent unit 1236 is thus especially configured to contain the scale inhibitor adsorbent 230 while allowing transport of water 2 through the adsorbent unit 1236.

FIG. 2c schematically depicts an embodiment wherein the adsorbent unit 1236 comprises a fluidized bed system 240, which in operation provides a fluidized bed of scale inhibitor adsorbent 230 in water 2. For instance, adsorbent containing particles may be contained between filters within the adsorbent unit 1236. The filters are indicated with parallel lines, here by way of example between the descaling reactor outlet 212 and the descaling unit outlet 202.

Figure 3A:
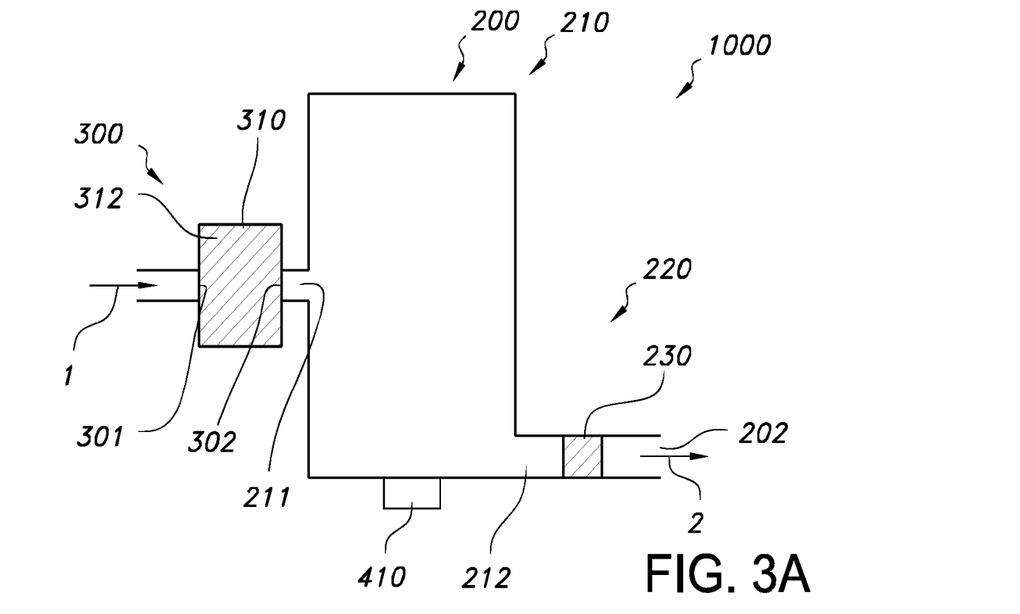
FIGS. 3*a*-3*b* schematically depict some variants of the scale inhibitor dosing unit.
Figure 3B:
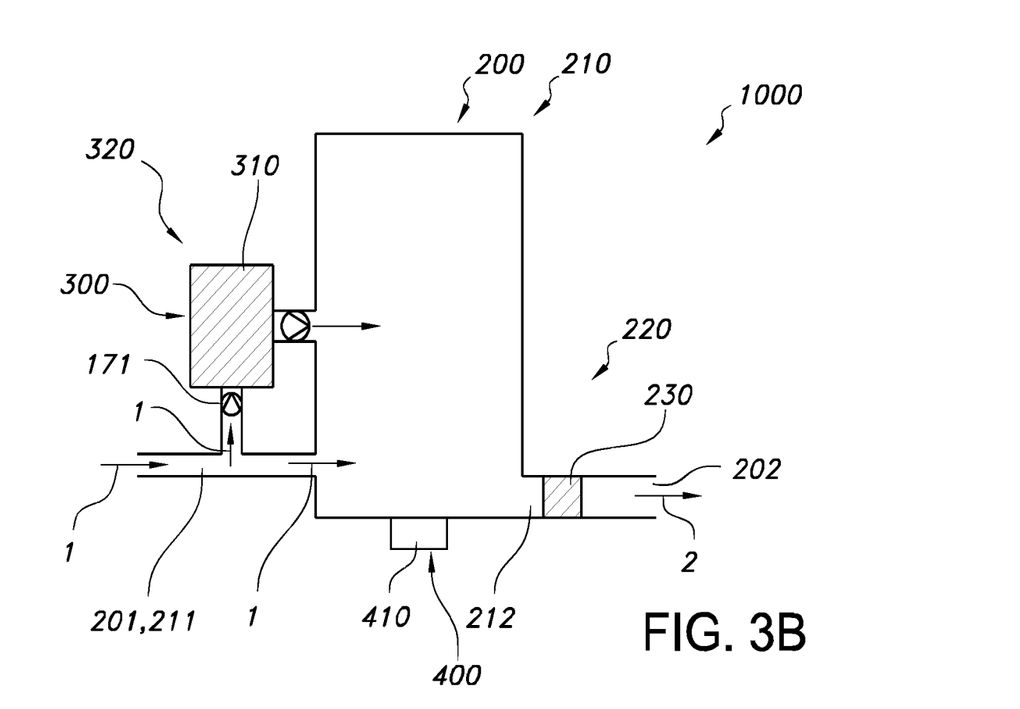

As indicated above, FIG. 1 shows an example wherein the scale inhibitor dosing unit 300 comprises a metering unit 320 configured to introduce a controlled amount of descaling liquid 311 into the descaling reactor 210. FIGS. 3a-3b schematically depict some variants of the scale inhibitor dosing unit. FIG. 3a schematically shows an embodiment wherein the scale inhibitor dosing unit 300 is a flow through unit, having a dosing unit inlet 301 for introduction of water 1 and a dosing unit outlet 302 in fluid communication with the descaling reactor 210, for providing to the reactor water enriched with scale inhibitor 310 contained aby said flow through unit. The scale inhibitor 310 may e.g. be available as slow release material. Hence, the scale inhibitor dosing unit 300 may comprise an immobilized slow-release element 312 comprising said scale inhibitor 310 and configure to release scale inhibitor 310 upon contact with water 1. FIG. 3b schematically depicts an embodiment of the scale inhibitor dosing unit 300, wherein the functional unit 1000 is configured to flow part of the water 1 via the scale inhibitor dosing unit 300 and to flow a part of the water 1 directly to the reactor 210. The water 1 flowing to the scale inhibitor dosing unit 300 is substantially enriched with scale inhibitor 310, and this liquid is then introduced in the descaling reactor 210, whereby the concentration of the scale inhibitor 310 in this liquid is such, that the desired concentration in the descaling reactor is obtained (such as about in the range of 0.1-10 ppm). Hence, also the variant of FIG. 3b is a flow-through scale inhibitor dosing unit 300.

Figure 4:
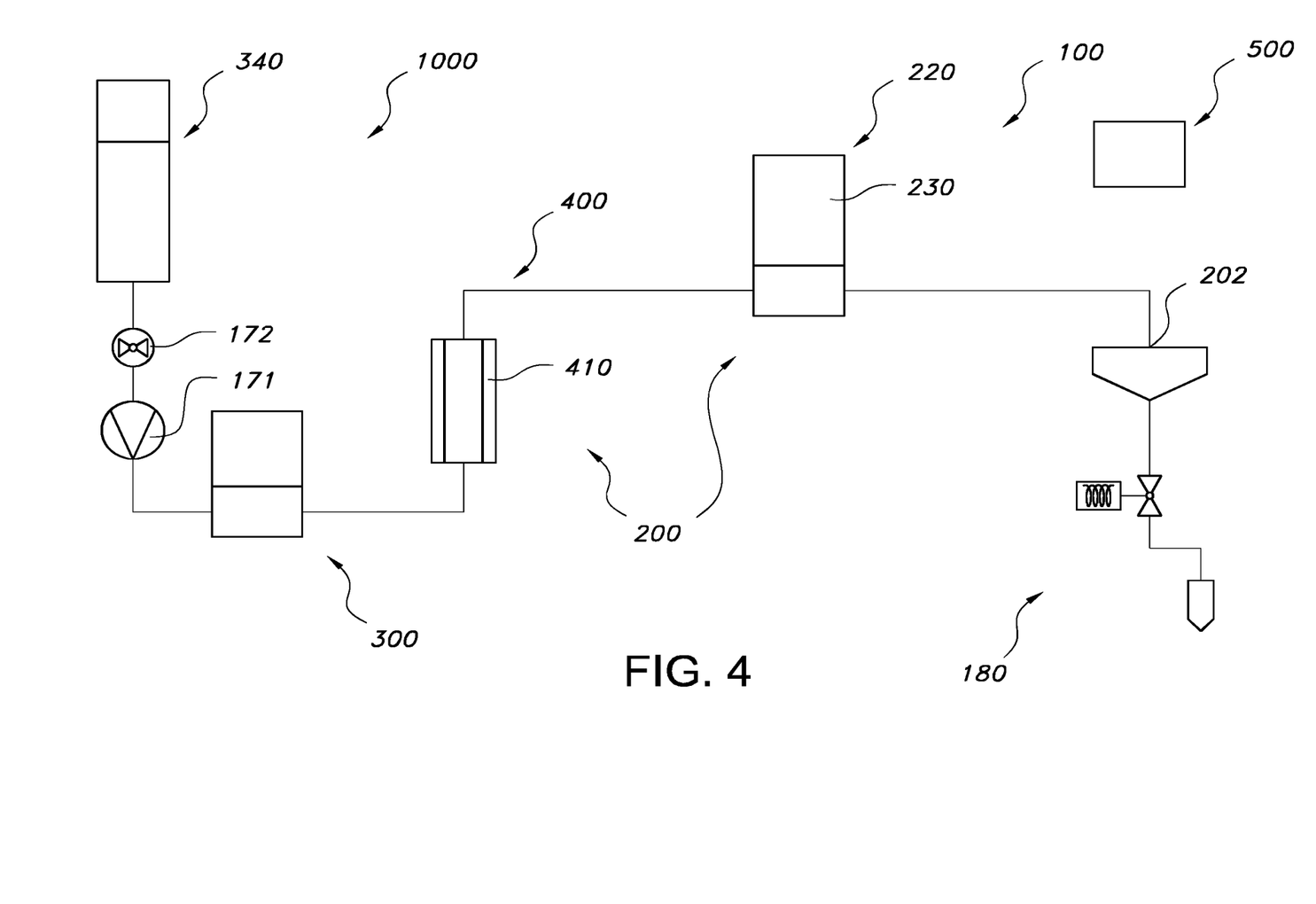
FIG. 4 schematically depicts a further embodiment of a domestic appliance.

FIG. 4 schematically depicts a further embodiment of a domestic appliance 100, like a coffee-maker. Here, four different stages are indicated, with from left to right a water supplying stage, a heating stage, a scale inhibitor absorbing stage and an application stage, such as a brew module. Reference 340 is a water reservoir. Such embodiment may be useful for e.g. stand alone apparatus, or a buffer. Reference 172 indicates a flow meter. Here, the scale inhibitor dosing unit 300 is also a flow-through system. Downstream thereof, and upstream of the outlet unit 220 with adsorbent 230, the descaling reactor is configured, here indicated as heating unit 400. For instance, the descaling reactor may be a boiler (unit). Reference 180 indicates a brewing unit, e.g. to make coffee.

It has been found that phosphonates may very effectively preclude the deposition of scale in the water-supply system. Breakdown of domestic appliances as a result of the water-supply system becoming obstructed is reduced substantially by the use of phosphonate compounds. Scale formation may occur in the descaling reactor 210 but scale particles may remain small in size and may very uniformly distributed in the water inside the descaling reactor 210. Obstruction of the descaling reactor 210 outlet ports, located in e.g. the bottom of the descaling reactor 210, caused by scale chippings which become detached no longer occurs.

Phosphonates in very small concentrations have a scale-growth inhibiting effect in hard tap water. For example, the deposition of scale in the water-supply system of the domestic appliance is very effectively inhibited when so-called "Standard Hard Water" containing 1 ppm of a phosphonate compound is used. "Standard Hard Water" is to be understood to mean herein water having a pH-value of approximately 8, containing 4 mmol/l of $NaHCO_3$, 0.77 mmol/l of $MgSO_4$ ad 2.23 mmol/l of $CaCl_2$. At concentrations below 0.2 ppm of the phosphonate compound no effective scale-growth inhibition is observed. Up to a phosphonate concentration of approximately 20 ppm, the degree of scale-growth inhibition is approximately proportional to the concentration. At higher concentrations the scale-growth inhibition increases hardly if at all. In practice it has been found that a concentration of maximally 10 ppm of phosphonate compound is more than sufficient to satisfactorily inhibit scale growth. A concentration which is optimal in practice ranges between 1 ppm and 5 ppm.

A further favorable property of phosphonates is that they generally exhibit a relatively good thermal stability in aqueous solutions. For example, these compounds do not decompose in the relevant temperature range up to 100° C. In this connection, it is noted that a scale-growth inhibitor such as polyphosphate has the disadvantage that it relatively rapidly decomposes to inactive monophosphate at a higher temperature.

A suitable embodiment of the domestic appliance in accordance with the invention is characterized in that the phosphonate compound used is readily soluble in water, and in that the domestic appliance comprises e.g. a metering system for introducing this phosphonate compound into the descaling reactor 210.

A readily soluble phosphonate compound is to be understood to mean herein especially a compound whose solubility at room temperature in Standard Hard Water exceeds 1000 ppm. As noted above, small quantities of phosphonate suffice to obtain an active scale-growth inhibiting effect. Consequently, a small quantity of only a few ml of a concentrated solution of a readily water-soluble phosphonate compound in a separate metering system suffices to treat the overall quantity of water used throughout the life of the domestic appliance. In such an embodiment, after the descaling reactor 210 has been filled by means of a, for example mechanical, metering system, the user must add a very small quantity of phosphonate compound to the water.

Another favorable embodiment of the domestic appliance in accordance with the invention is characterized in that the phosphonate compound used is moderately soluble in water, and in that the domestic appliance comprises especially a metering system for introducing this phosphonate compound into the descaling reactor 210.

A moderately soluble phosphonate compound is to be understood to mean herein a compound whose solubility at room temperature in Standard Hard Water ranges between approximately 30 ppm and 1000 ppm. Such a moderately soluble compound can be provided as a solid in a separate metering system. The operation of this metering system is such that prior to the first filing operation of the domestic appliance a certain quantity of water is drawn from the descaling reactor 210. After a part of the moderately soluble phosphonate compound has dissolved in this limited quantity of water (typically a few ml), this water is metered into the descaling reactor 210 after which a fresh quantity of water is automatically drawn into the separate metering system. After a subsequent filling operation of the domestic appliance, this new quantity of phosphonate-saturated water can be metered into the fresh water to be treated. This process may be repeated time after time. The volume of the separate metering system, the type of moderately soluble phosphonate compound and the volume of the descaling reactor 210 are preferably matched to each other in such a manner that after the phosphonate enriched water, such as phosphonate-saturated water, is metered into the descaling reactor 210 the concentration of phosphonate compound in said descaling reactor 210 is approximately 1-5 ppm.

A poorly soluble phosphonate compound is to be understood to mean herein a compound whose solubility at room temperature in Standard Hard Water is less than 30 ppm. Such poorly soluble phosphonate compounds can be introduced into the descaling reactor 210 as solids, so that they directly contact the water. Due to the low solubility of these compounds in water, the maximum concentration of phosphonate compound at room temperature never exceeds maximally approximately 30 ppm. In this embodiment of the invention it may therefore not be necessary to adapt the concentration of phosphonate compound in the descaling reactor 210. Consequently, if this class of phosphonate compounds is used no separate metering system is required. Therefore, this embodiment is preferred to the above-described embodiments.

In principle, the compound can be present in the inhibitor dosing unit 300 (and provided to the descaling reactor 210) as a coarse-grained powder, optionally in a fine-mesh envelope. The fine-mesh envelope allows, on the one hand, a satisfactory interaction between the water and the powder and, on the other hand, precludes that the powder itself can obstruct the water-supply system. Preferably, however, the phosphonate compound is provided in the inhibitor dosing unit 300 in the form of a compressed pellet. In principle, a loose pellet can be provided in the inhibitor dosing unit 300, however, it is to be preferred to accommodate such a pellet in an envelope which consists either partly or completely of a fine-mesh material. In this manner, obstruction of the water-supply system is precluded if the pellet were to decompose into smaller parts after a prolonged period of time. This may especially be relevant in the case of a flow-through inhibitor dosing unit 300.

Very satisfactory results have been obtained with a phosphonate compound which dissolves poorly in water and which corresponds to the formula $Ca_2[PO_3$—$C(OH)(CH_3)$—$PO_3]$ (dicalcium salt of 1-hydroxyethylene-(1,1 diphosphonate acid)). This phosphonate compound is poorly soluble at room temperature in Standard Hard Water, while the dissolution rate of this compound is relatively high. This relatively high dissolution rate ensures that the maximum concentration of phosphonate compound in the descaling reactor 210 is rapidly reached after a new filling operation.

Tests were performed with a filter system and with a fluidized bed. The concentration of the scale inhibitor was varied between 1-10 ppm and the temperature of the water was also varied. In this way, 8 different experiments were executed with different conditions. The phosphonate removal was very high, and often the removal was such, that the remaining phosphonate was below the detection limit (of about 0.03 mg phosphor/l). The removal of phosphonate could be obtained with an efficiency of 98% or more. In non-optimized systems, the fluidized bed variant seemed to provide very good results.

Note that the herein described and depicted embodiments are not limited to the specific variants of elements schematically depicted in the schematic drawings.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A domestic appliance configured to provide descaled water during operation, wherein the domestic appliance comprises:
a descaling unit for the production of descaled water, wherein the descaling unit comprises a descaling reactor, a descaling unit inlet for introduction of water into the descaling reactor, and a descaling unit outlet for release of descaled water from the descaling reactor; and
a scale inhibitor dosing unit configured to provide a scale inhibitor to the descaling reactor, wherein the scale inhibitor comprises a phosphonate, wherein:
the descaling unit further comprises an outlet unit comprising (i) said descaling unit outlet and (ii) a scale inhibitor adsorbent configured upstream of said descaling unit outlet, wherein the scale inhibitor adsorbent is selective for said scale inhibitor, and wherein the scale inhibitor adsorbent is in the form of a membrane;
the outlet unit comprises an adsorbent unit, comprising an inlet in fluid connection with the descaling reactor, and an outlet, in fluid communication with the descaling unit outlet, wherein the adsorbent unit is configured to contain the scale inhibitor adsorbent, and prevent the scale inhibitor adsorbent to leave the adsorbent unit, while allowing transport of water through the adsorbent unit.

2. The domestic appliance according to claim 1, wherein the membrane is configured such that water from the descaling reactor reaches the descaling unit outlet via the membrane.

3. The domestic appliance according to claim 1, wherein the descaling unit comprises a first volume (V1) downstream of the scale inhibitor adsorbent and upstream of the descaling unit outlet, wherein the descaling reactor comprises a descaling reactor volume (V2), and wherein the first volume (V1) and the descaling reactor volume (V2) have a ratio $V1/V2 \leq 0.1$.

4. The domestic appliance according to claim 3, wherein the first volume (V1) is equal to or smaller than 20 ml.

5. The domestic appliance according to claim 1, wherein the scale inhibitor dosing unit is a flow through unit, having a dosing unit inlet for introduction of water and a dosing unit outlet in fluid communication with the descaling reactor.

6. The domestic appliance according to claim 5, wherein the scale inhibitor dosing unit comprises an immobilized slow-release element comprising said scale inhibitor and configure to release scale inhibitor upon contact with water.

7. The domestic appliance according to claim 1, wherein the scale inhibitor dosing unit comprises a metering unit configured to introduce a controlled amount of descaling liquid into the descaling reactor, and wherein the descaling liquid comprises said scale inhibitor.

8. The domestic appliance according to claim 1, further comprising a heating element configured to heat water in the descaling unit.

9. The domestic appliance according to claim 1, wherein the scale inhibitor comprises one or more of HEDP (1-hydroxy(ethane-diphosphonic acid)), NTMP (Nitrilotris(methylene-phosphonic acid)), DTPMP (Diethylenetriamine penta (methylene-phosphonic acid)), and a salt of one or more of the afore-mentioned.

10. The domestic appliance according to claim 1, wherein the domestic appliance is selected from a group consisting of a floor steam cleaner, a food steamer, a kettle, a coffee maker, an espresso maker, a tea maker, a hot chocolate maker, a soup maker, a water cooker, a water carbonator, a water softener, a water purifier, a steam generation device, a steam iron, and an air humidifier.

11. A domestic appliance configured to provide descaled water during operation, wherein the domestic appliance comprises:
a descaling unit for the production of descaled water, wherein the descaling unit comprises a descaling reactor, a descaling unit inlet for introduction of water into the descaling reactor, and a descaling unit outlet for release of descaled water from the descaling reactor; and
a scale inhibitor dosing unit configured to provide a scale inhibitor to the descaling reactor, wherein the scale inhibitor comprises a phosphonate, wherein the descaling unit further comprises an outlet unit comprising (i) said descaling unit outlet and (ii) a scale inhibitor adsorbent configured upstream of said descaling unit outlet, wherein the scale inhibitor adsorbent is selective for said scale inhibitor, and wherein the scale inhibitor adsorbent is in the form of a membrane.

12. The domestic appliance of claim 11, wherein the descaling reactor has a tubular shape, and wherein one or more heating elements are applied over part of a length of the tubular shaped descaling reactor.

13. The domestic appliance of claim 11, wherein the descaling reactor further includes one or more mixing elements to facilitate mixing of the scale inhibitor and the water.

* * * * *